United States Patent [19]

Sailer et al.

[11] Patent Number: 5,644,828
[45] Date of Patent: Jul. 8, 1997

[54] DEVICE FOR IN SITU REPAIRING OF A CYLINDER IN A PRINTING MACHINE

[75] Inventors: Colin Sailer, Augsburg; Paul Harmathy, Munich; Eckhard Tusché, Bobingen; Thomas Weissbacher, Neusäss; Heinrich Schoder, Inchenhofen; Xaver Bachmeir, Augsburg; Johannes Ruschkowski, Augsburg, all of Germany

[73] Assignee: MAN Roland Druckmaschinen AG, Offenbach am Main, Germany

[21] Appl. No.: 261,994

[22] Filed: Jun. 17, 1994

[30] Foreign Application Priority Data

Jun. 17, 1993 [DE] Germany ............... 43 20 069.9

[51] Int. Cl.$^6$ .................................................. B23P 6/00
[52] U.S. Cl. ................... 29/402.06; 29/402.19; 29/895.1; 29/51; 82/128; 82/82; 82/118; 451/49; 451/426; 409/166
[58] Field of Search ................ 29/402.06, 402.18, 29/402.19, 895.1, 51, 27 C, 33 R; 451/425, 426, 427, 424, 429, 49; 409/166, 178; 82/128, 1.11

[56] References Cited

U.S. PATENT DOCUMENTS

| 391,127 | 10/1888 | Dooley ....................... 451/425 |
| 426,192 | 4/1890 | Mansfield ..................... 451/425 |
| 1,634,534 | 7/1927 | Brewer ........................... 29/51 |
| 3,165,865 | 1/1965 | Bousquet et al. ............ 451/424 |
| 3,585,881 | 6/1971 | Sarka ............................ 451/425 |
| 4,575,972 | 3/1986 | Ohki et al. ................... 451/424 |
| 4,637,107 | 1/1987 | Romeu ........................... 29/27 C |
| 4,685,180 | 8/1987 | Kitaya et al. ................. 29/33 R |
| 4,837,918 | 6/1989 | Holy et al. .................... 29/27 C |
| 4,912,824 | 4/1990 | Baran . |
| 4,922,772 | 5/1990 | Silk ................................ 82/128 |
| 5,111,567 | 5/1992 | Leino et al. . |
| 5,214,829 | 6/1993 | Minagawa .................... 29/27 C |
| 8,305,550 | 9/1906 | Wilhelmi ....................... 451/425 |

FOREIGN PATENT DOCUMENTS

| 2343283 | 4/1975 | Germany . |
| 80011969 | 5/1982 | Germany ................... B23B 6/08 |
| 206905 | 2/1984 | Germany ................... C08L 63/00 |
| 3642080 | 6/1987 | Germany ................... B23B 5/08 |
| 3631146 | 3/1988 | Germany ................... B23Q 17/22 |
| 3814021 | 11/1988 | Germany . |
| 3715324 | 11/1988 | Germany ................... C23C 4/12 |
| 3821658 | 12/1989 | Germany ................... B41N 1/08 |
| 3925509 | 2/1991 | Germany ................... B41F 13/10 |
| 4124423 | 2/1992 | Germany ................... C23C 4/12 |

OTHER PUBLICATIONS

Copy of article "Tampongalvanisieren —ein Reparaturverfahren für zylidische Bauteile"; Betz, Adolf; Der Polygraph, 1988, No. 9, pp. 807–810.
Copy of article "Strahlspanen und Druckstrahlen", Metalloberflache 37 (1983) 9, pp. 389–392.

Primary Examiner—S. Thomas Hughes
Assistant Examiner—Marc W. Butler
Attorney, Agent, or Firm—Cohen, Pontani, Lieberman, Pavane

[57] ABSTRACT

A device for repairing a cylinder in a printing machine while the cylinder is installed in the printing machine. The device includes a cross slide rail having a base body with longitudinal guides, a longitudinal support slidably mounted on the longitudinal guides, and a transverse support connected to the longitudinal support. The cross slide rail is removably mounted to side walls of the printing machine so as to be parallel to a longitudinal axis of the cylinder to be repaired. A pull spindle is rotatably mounted to the base body and operatively connected to the longitudinal support so that the rotation of the pull spindle moves the longitudinal support along the longitudinal guides of the base body. A tool holder is connected to the transverse support for carrying a tool for working the cylinder. A mechanism for driving the cylinder is also provided.

9 Claims, 13 Drawing Sheets

DEVICE FOR IN SITU REPAIRING OF A CYLINDER IN A PRINTING MACHINE

BACKGROUND OF THE INVENTION

1. Field of the Invention

The invention is directed to a process and a device for repairing cylinders in printing machines, in particular form cylinders, by thermal spray coating.

2. Discussion of the Prior Art

A smooth, cylindrical surface of cylinders in printing machines is a prerequisite for high quality in the printed products produced by these machines. The surface of the cylinders can be destroyed mechanically, e.g. by rolling over hard extraneous materials, by chemical corrosion, wear, etc.

Tampon galvanization is recommended for repair of such cylinder surfaces in an article by Betz, Adolf, entitled "Tampon galvanization - a method for repairing cylindrical structural components", *Der Polygraph*, 1988, No. 9, pages 807 and 810. However, only localized damaged spots can be repaired with such a method.

The invention described in DD 206 905 proposes a method for repairing cylinders in which an epoxy-containing molding compound is applied by trowel to damaged locations on the cylinder. However, it is also only possible to make local repairs with this method.

Repairs can be made to the entire surface, e.g., by means of thermal spraying. But the cylinder must be removed from the printing machine for this purpose, which substantially increases the cost of repair.

SUMMARY OF THE INVENTION

Accordingly, it is an object of the present invention to provide an inexpensive process and a device for repairing the entire surface of printing machine cylinders by thermal spray coating.

Pursuant to this object, and others which will become apparent hereafter, one aspect of the present invention resides in a process and a device for repairing a cylinder of a printing machine while the cylinder remains installed in the printing machine. A cross slide rail is installed in the printing machine parallel to the cylinder to be repaired. Then, with equipment installed that is on the cross slide rail, the cylinder jacket is removed to a base diameter. Next, the cylinder surface is degreased, blasted and preheated. Then a thermal spray coating is applied to the cylinder surface, which coating is subsequently polished and sealed. Again, this is all accomplished by various tools which are supported on the cross slide rail while the cylinder remains installed in the printing machine.

The invention does not require that the cylinder to be repaired be removed from the printing machine or, as the case may be, transported to the repair shop and reinstalled. Accordingly, repair is economical in terms of cost and time.

It is possible with the present invention to repair the entire outer surface of the cylinder or to only repair damage to portions of the cylinder. Also, the step of removing the cylinder jacket can be accomplished in a variety of ways. For example, the cylinder can be machined by turning, worked by abrasive blasting methods, machined by grinding or machined by cutting. Still further, the cylinder can be worked to a depth corresponding to the coating to be applied and it is also possible to remove old coatings from the cylinder. For example, the old coatings can be removed by water-jet blasting.

There are also a number of ways for applying the coating to the cylinder. For example, the coating can be affected by flame spraying, plasma spraying or high-speed flame spraying. The cylinder can also be coated by the thin-layer method and then polished or the cylinder can be coated by the thick-layer method and then ground to finish dimensions and simultaneously polished.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
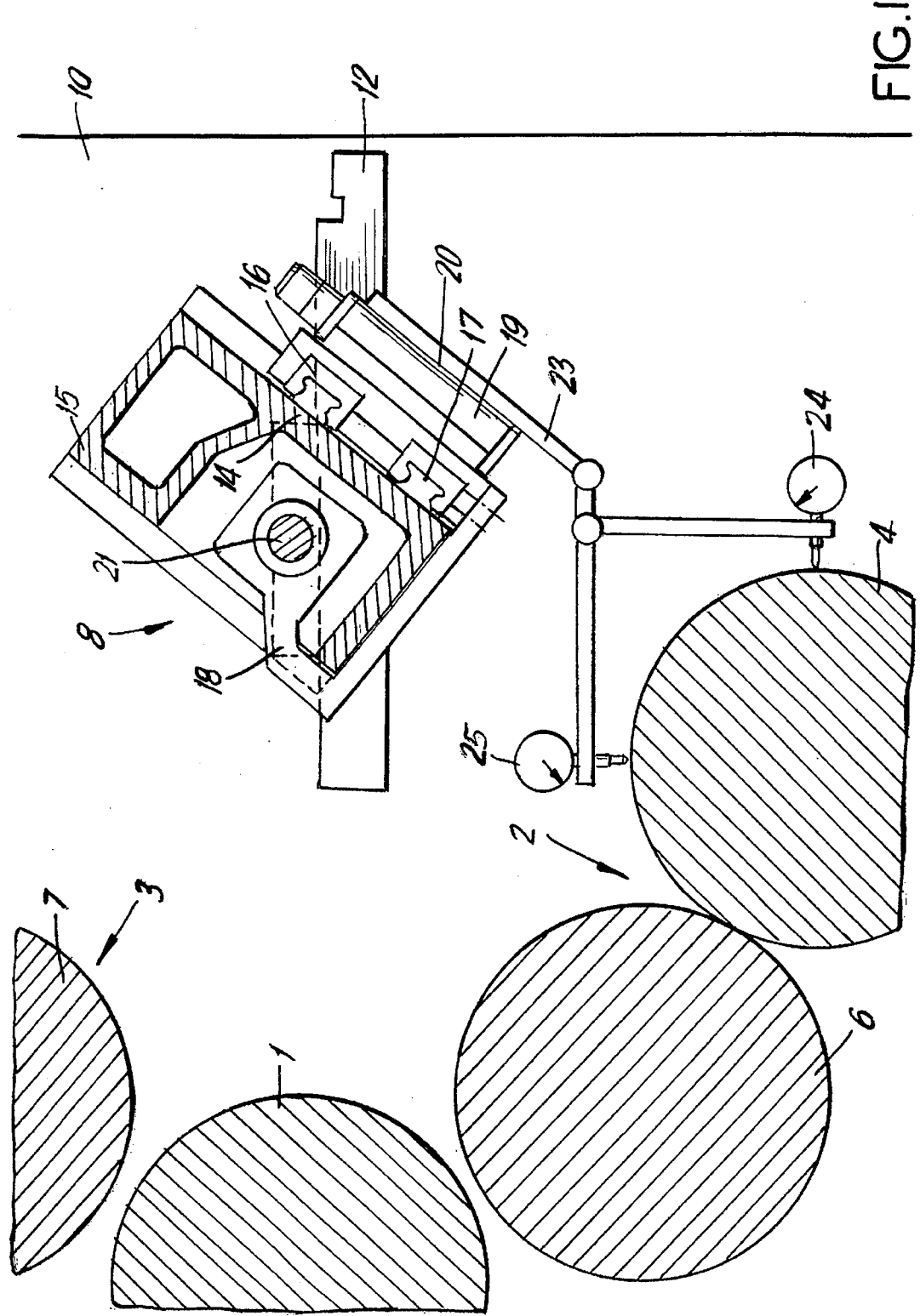
FIGS. 1 and 2 show a side view of the cross slide rail during adjustment.

The invention is described in the following with reference to the repair of form cylinders of a satellite printing unit. FIG. 1 shows a portion of this printing unit in a schematic side view in section. A lower printing mechanism 2 (FIG. 1) and an upper printing mechanism 3 are arranged at a satellite cylinder 1. Each printing, mechanism 2 (FIG. 1), 3 contains a form cylinder 4, 5 and a transfer cylinder 6, 7. The upper printing mechanism 3 and the form cylinder 5 are clearly shown in FIG. 5.

Figure 3:
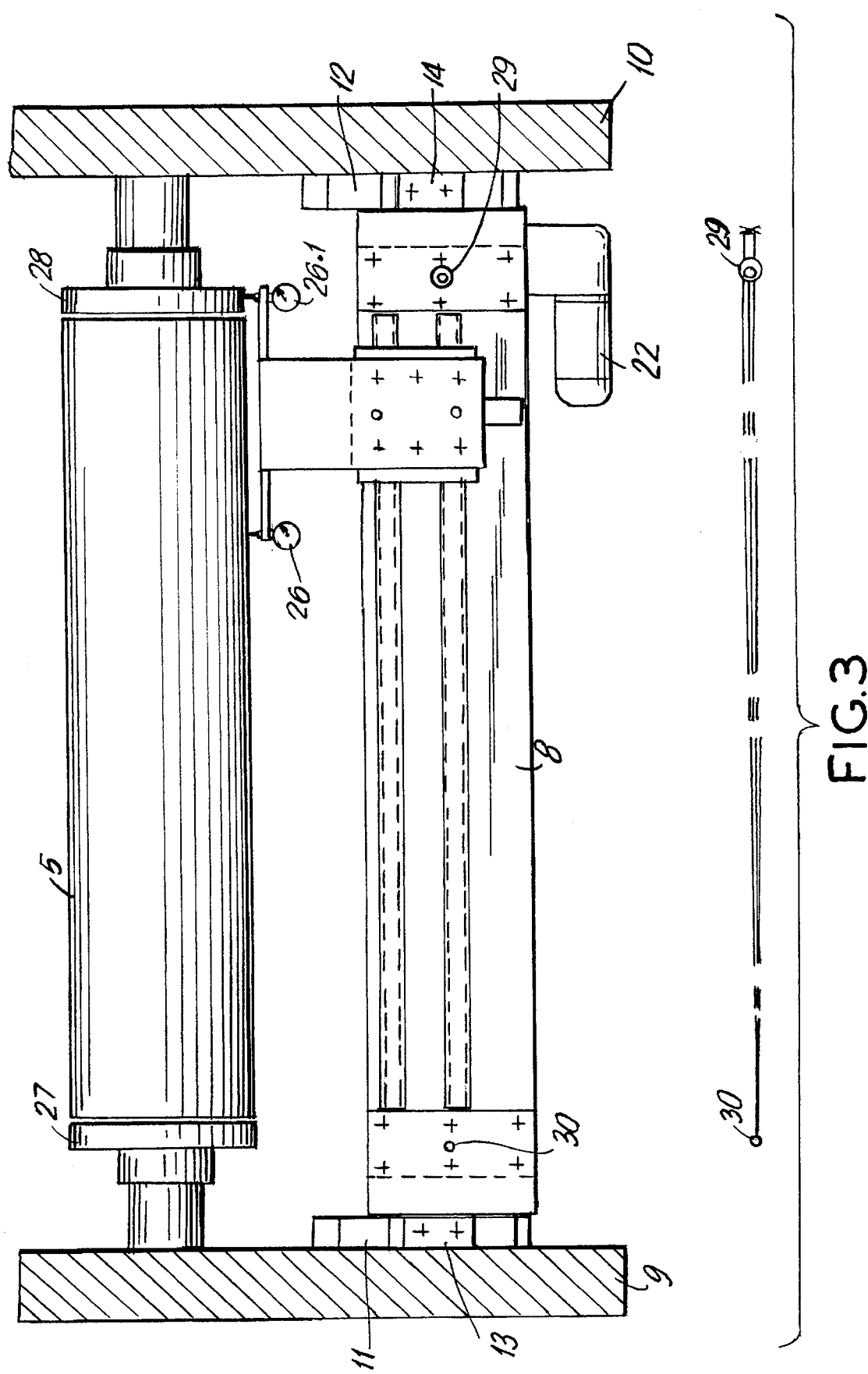
FIG. 3 shows a plan view of the cross slide rail during adjustment.
Figure 5:
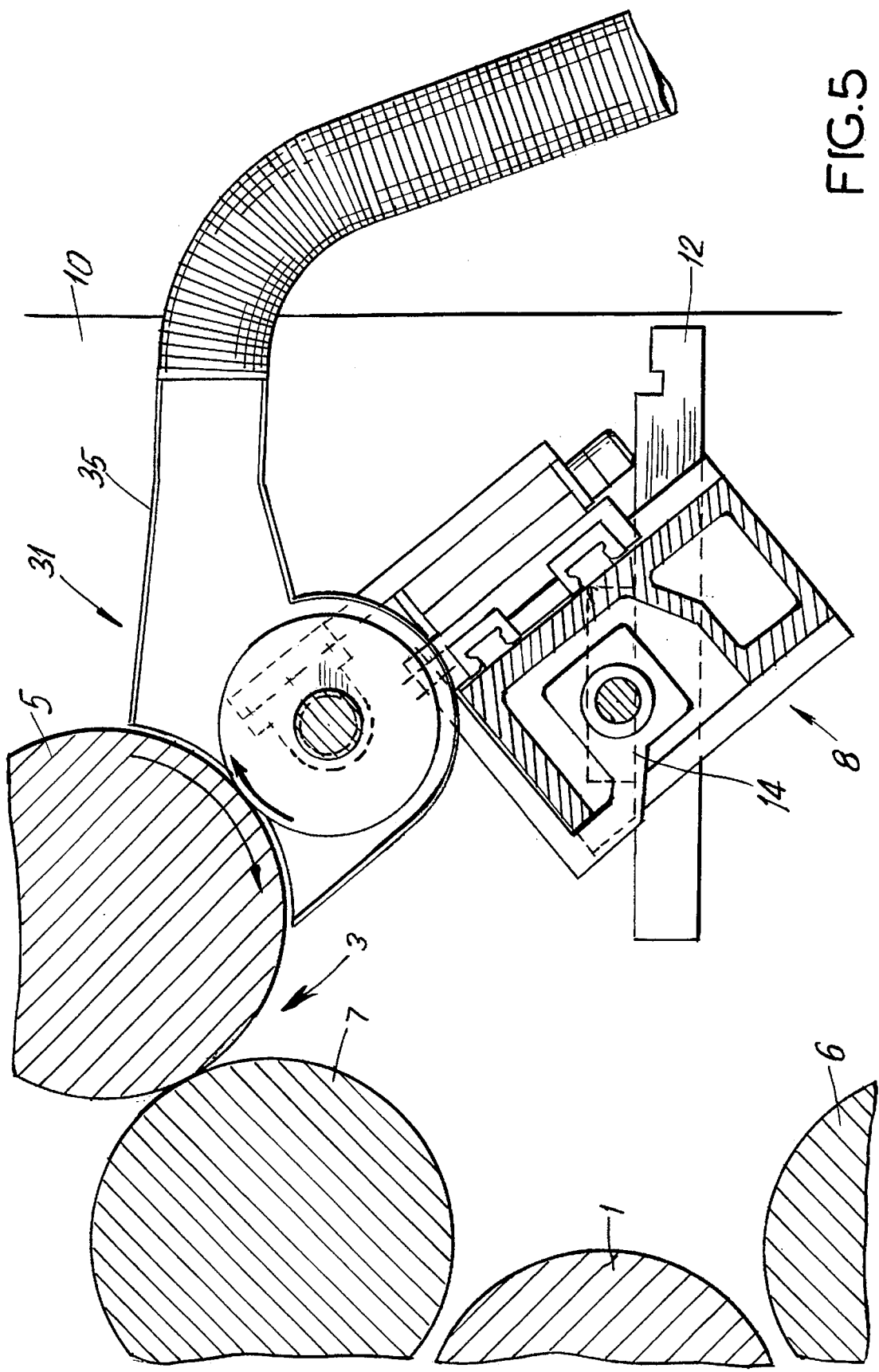
FIG. 5 shows section V—V according to FIG. 4.

In order to perform surface repairs on the form cylinder 4 as shown in FIGS. 1 and 5 by thermal spray coating, a cross slide rail 8 is inserted into the printing unit. For this purpose, as shown in FIG. 3, strips 11, 12 are screwed to the inner sides of the side walls 9, 10 of the printing machine. The two strips 11, 12 are located at the same height and are parallel to one another. The cross slide rail 8 rests on the strips 11, 12 by its bearing blocks 13, 14 which are screwed to the strips 11, 12.

The cross slide rail 8 has a base body 15 supporting two longitudinal guides 16, 17. A longitudinal support 18 is movable on the latter and accommodates a transverse support 19 which can slide transversely to its movement direction. This transverse support 19 is outfitted with a tool adapter 20. The longitudinal support 18 is in a drive connection with a pull spindle 21 which is driven by a feed motor 22, shown in FIG. 3. The feed motor 22 has variable speeds and the rotating movement of the pull spindle 21 is advantageously converted into a feed movement of the longitudinal support 18, e.g. by means of a ball-bearing friction gear. The feed direction can be changed by reversing the pitch of this gear unit. Thus, considered in its entirety, the longitudinal support 18 can be adjusted with respect to speed and can reverse direction.

Figure 2:
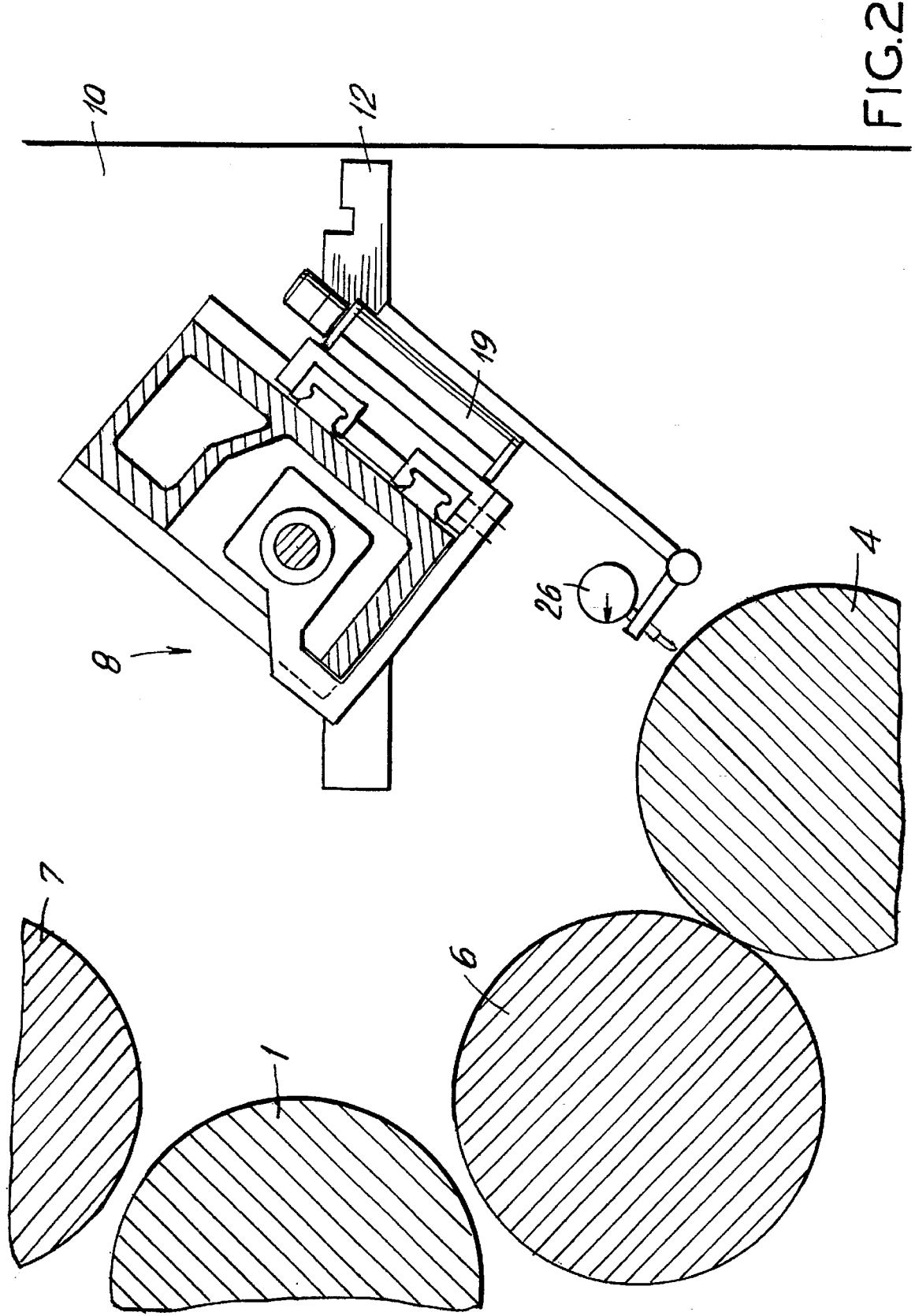
Figure 4:
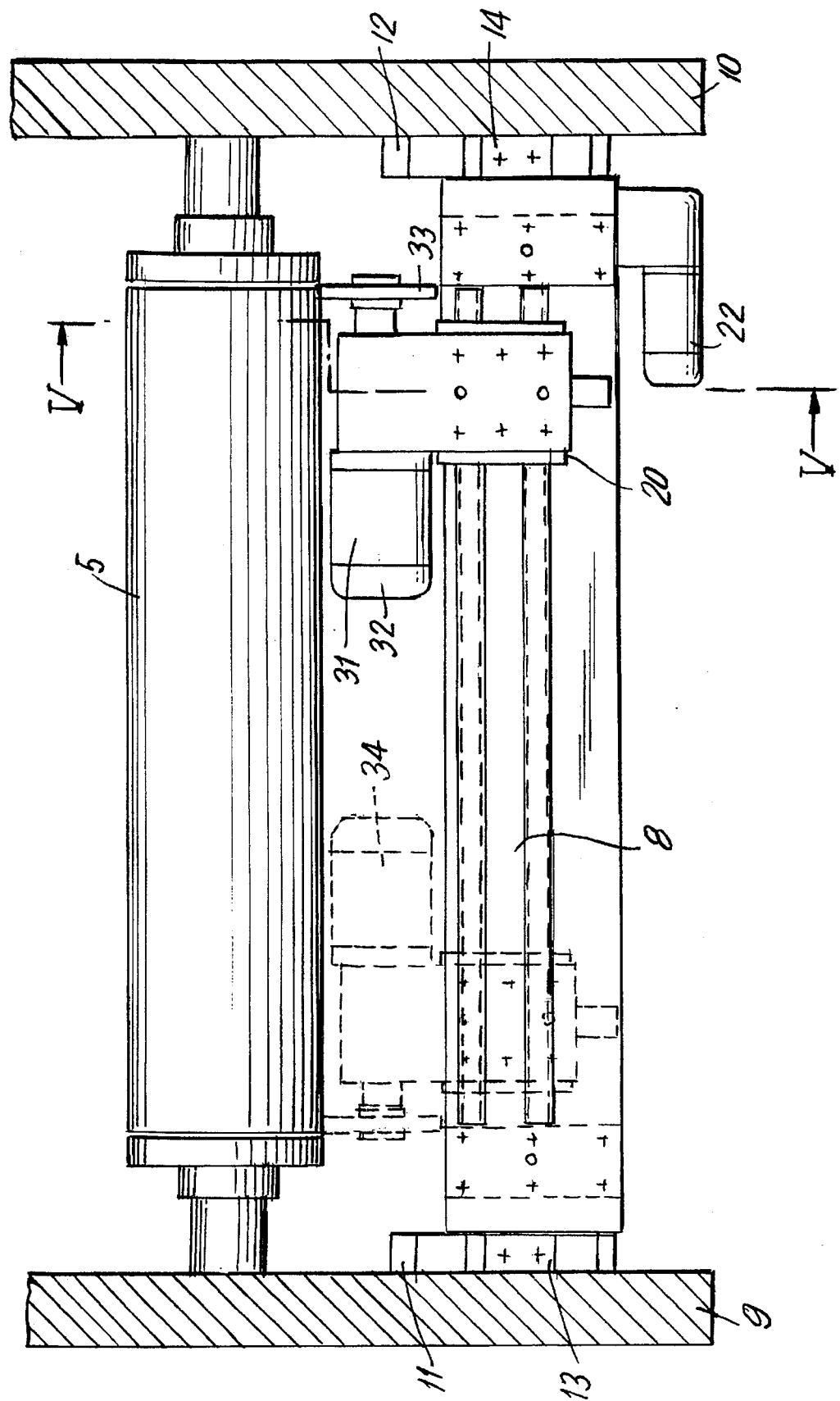
FIG. 4 shows the cross slide rail with a grinding disk, without a suction device.

The cross slide rail 8 used in the printing unit is first aligned with its longitudinal support axis parallel to the axis of the form cylinder 4 or 5 to be repaired. For this purpose, a dial gauge holder 23 carrying dial gauges 24, 25 which are adjustable horizontally and vertically to the form cylinder 4 is placed on the tool adapter 20. A rough alignment of the cross slide rail 8 is effected by means of these dial gauges 24, 25. A precision adjustment of the cross slide rail 8 is then effected by means of dial gauges 26 which are directed radially to the cylinder 4 to be repaired and are movable in the movement direction of the transverse support 19, shown in FIG. 2. The dial gauges 24 to 26 are arranged in pairs at a distance from one another. For example, FIG. 3 shows the adjustment of the dial gauges 26 at the form cylinder 5 for the precision alignment of the cross slide rail 8 relative to this cylinder, the dial gauges 26 being displaceable in the direction of the transverse support. For this purpose, the dial gauges 26 are first moved approximately to the center of the cylinder, adjusted at the cylinder jacket, and adjusted to the same value, e.g. 0. The left dial gauge 26 is then moved toward the left cylinder bearer or bearer ring 27 and the right dial gauge 26.1 is moved toward the right bearer ring 28 one after the other. When the dial gauges 26, 26.1 which are moved toward the bearer rings 27, 28 show the same reading, the longitudinal axes of the form cylinder 5 and cross slide rail 8 are parallel. Otherwise, the cross slide rail 8 can be brought into parallel by means of the eccentric 29 by swiveling to one side around the center of rotation 30. After the cross slide rail 8 has been installed in the printing unit in the correct attitude, the cylinder is prepared for thermal spray coating. If the cylinder already has a coating, be this a metallic layer or a ceramic layer, this coating must be removed. However, the invention also enables repair of cylinders which are not coated. In this case, the surface must be removed to a depth such that the damaged locations are eradicated. The cylinder must at least be worked off by an amount corresponding to the thickness of the coating to be applied. In the variant shown in FIG. 4, the cylinder jacket is worked off by grinding. For this purpose, a grinding device 31 is fitted to the tool adapter 20 of the cross slide rail 8. This grinding device 31 has a grinding disk 33 which is driven by a motor 32 and can be adjusted to the form cylinder 5 with respect to grinding depth by means of the transverse support 19. The feed along the length of the form cylinder 5 is effected by displacement of the longitudinal support 18 by means of the pull spindle 21, shown in FIG. 1. Since it is not possible to move along the entire length of the cylinder jacket due to the confined spatial conditions with respect to the grinding device 31, the inaccessible outer surface area of the cylinder on the left-hand side is machined with a grinding device 34 which is inserted in the tool adapter 20 and is laid out in a mirror-inverted manner with respect to the grinding device 31. This may not be necessary if there is more room between the side walls so that the longitudinal support has a sufficient movement path. According to the invention, the cross slide rail can also be arranged outside the inner walls of the printing machine. The second grinding device can also be dispensed with in this case, but the construction and fastening of the cross slide rail must be modified.

FIG. 5 shows the grinding device 31 in section. The suction device 35 which encloses the grinding disk 33 and prevents grinding dust from reaching the printing machine can also be seen in FIG. 5. The form cylinder 5 is driven during the grinding. This can be effected, for example, by means of the printing machine drive or by means of the washing drive of the inking mechanism when the cylinder is separate from the printing machine drive.

Figure 6:
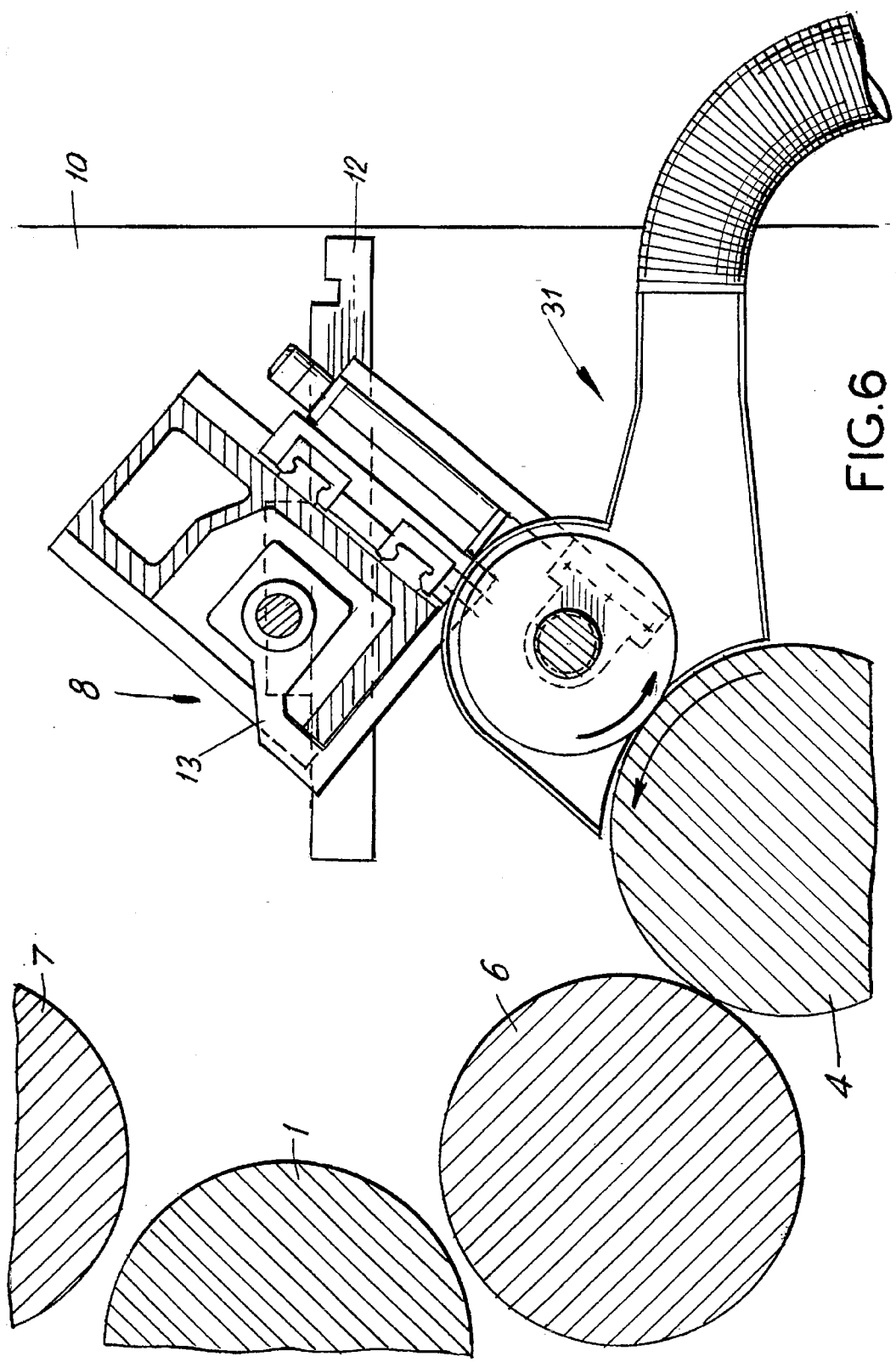
FIG. 6 shows an adjustment variant with reference to FIG. 5.

In FIG. 6 the grinding device 31 is adjusted at the bottom form cylinder 4. In so doing, the screw-attachment positions of the strips 11 and 12 shown for example in FIG. 4 may be retained provided they are arranged in such a way that the horizontal plane through the center of the square bearing blocks 13, 14 screwed to the strips 11, 12 is equidistant from the bottom and top form cylinders 4, 5. In this case, the grinding device 31 may be adjusted to the bottom form cylinder 4 simply by arranging the cross slide rail 8 on the strips 11, 12 on its opposite side and rotating it by 180° around its longitudinal axis. Of course, it must then be readjusted so that its axis lies parallel to that of the form cylinder 4.

Figure 7:
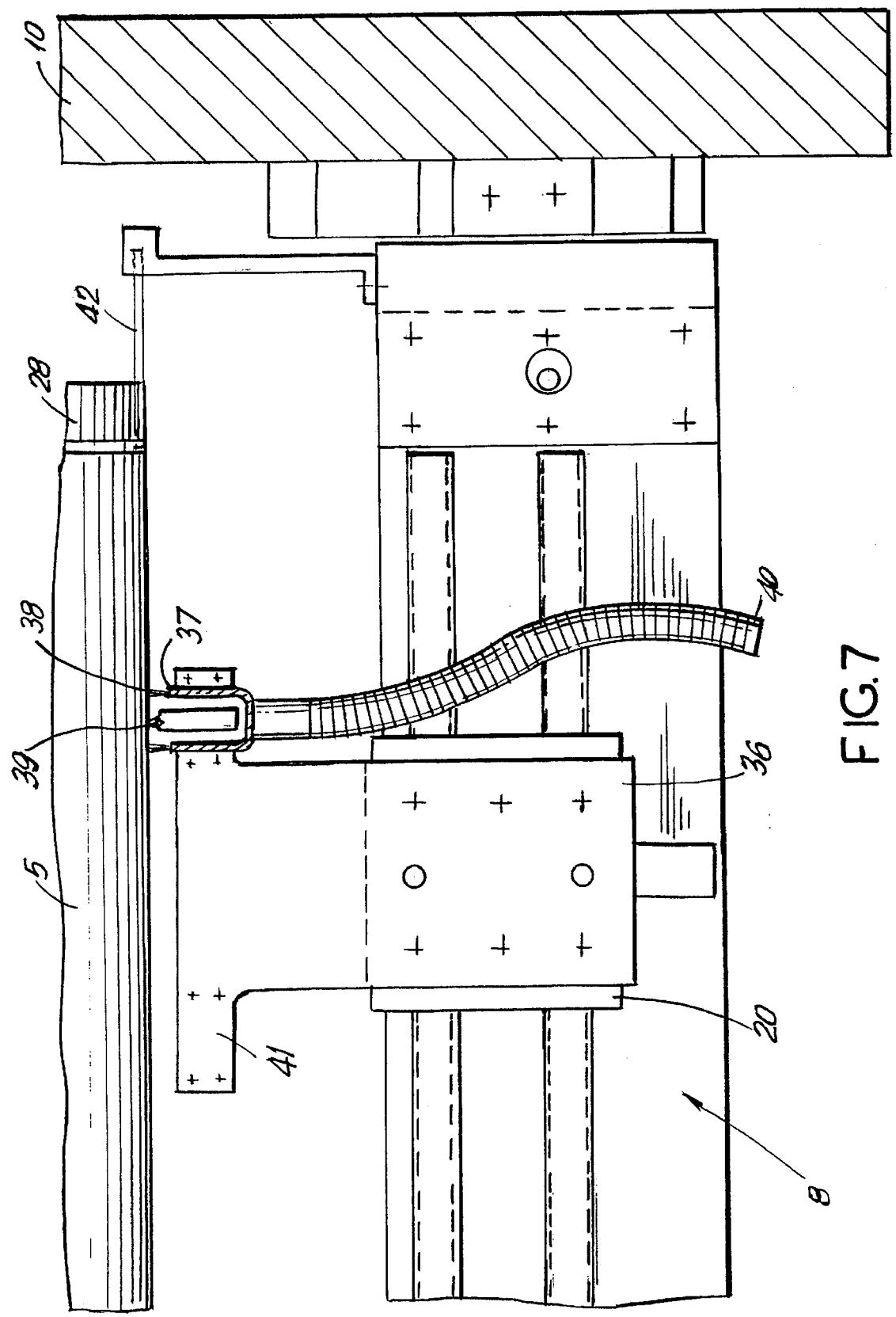
FIG. 7 shows a partial view of the cross slide rail with a turning device.

In FIG. 7 a turning device 36 which is fastened to the tool adapter 20 of the cross slide rail 8 is used for machining the form cylinder 5. In this case, a cover 37 with brushes 38 surrounding the turning cutter 39 contacts the form cylinder 5. A suction device 40 for removing the worked off material is connected to the cover 37. In order to machine the left-hand portion of the form cylinder 5 which is not accessible with the turning cutter 39, the latter, together with the cover 37, can be switched to the receptacle 41 of the turning device 36 on the left side. In other respects, the operation of the turning device is analogous to that of the grinding device. FIG. 7 also shows a cover 42 which protects the bearer ring 28 and, by means of a similar device, the bearer ring 27 from mechanical damage or other damage during the entire repair process.

Figure 8:
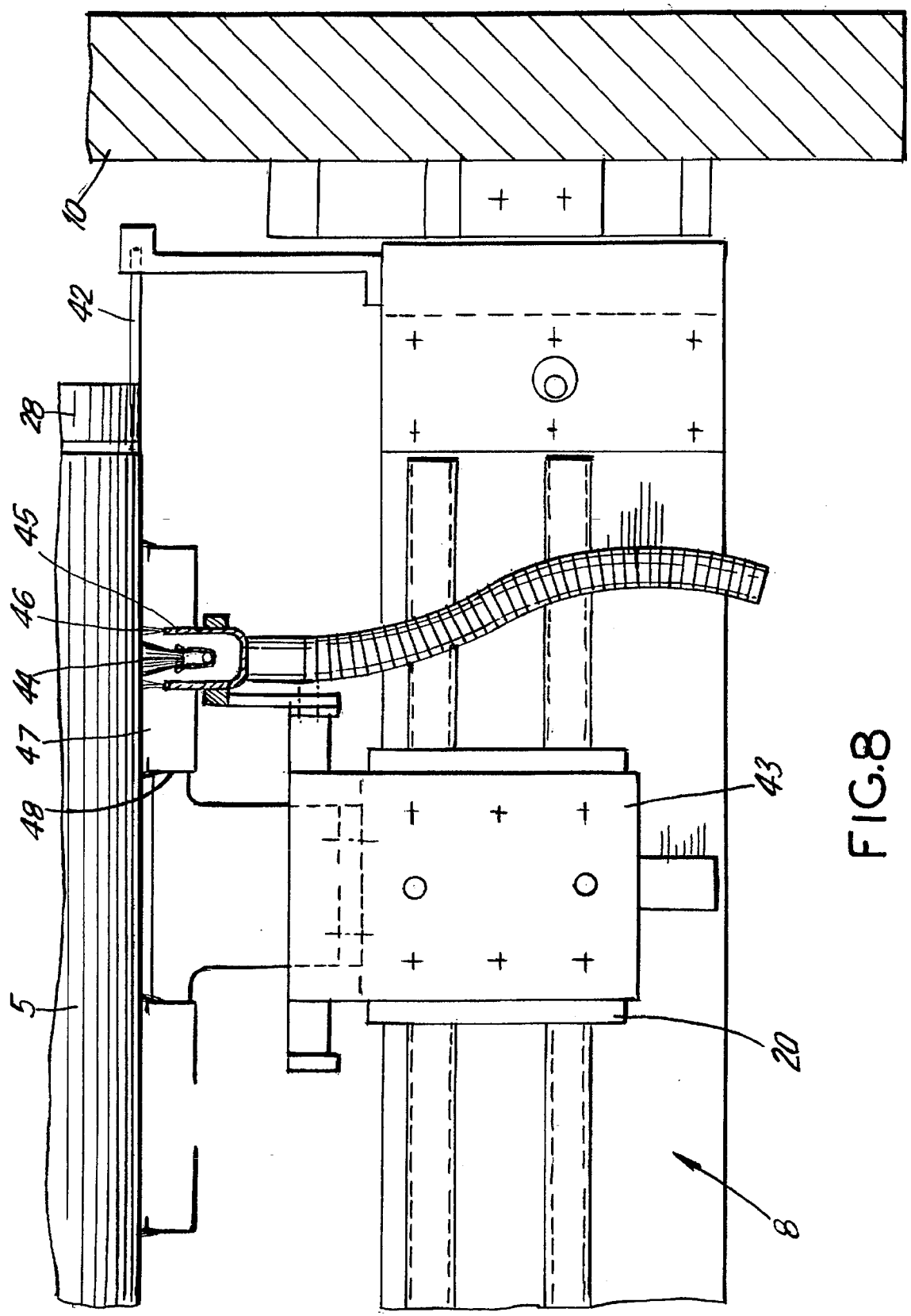
FIG. 8 shows a partial view of the cross slide rail with a sand blasting device.

In FIG. 8, an abrading device, in particular a sand blasting device 43, is used to machine the form cylinder 5. The sand blasting device 43 is screwed to the tool adapter 20 of the cross slide rail 8. Its blast nozzle 44 is enclosed by a cover 45 which contacts the cylinder 5 with brushes 46. The cover 45 is in turn enclosed by a suction device 47. The latter contacts the form cylinder 5 with brushes 48. Material is removed from the surface by means of the sand blast. In other respects, its operation is analogous to that of the devices described above. Blasting is especially appropriate for removing coatings. Blasting can also be effected, for example, with steel grit or water jets.

The surface of the cylinder to be repaired can also be removed by cutting. The corresponding device is similar to the grinding device 31, but uses a shell end mill or roller-type end cutter instead of a grinding disk.

Figure 9:
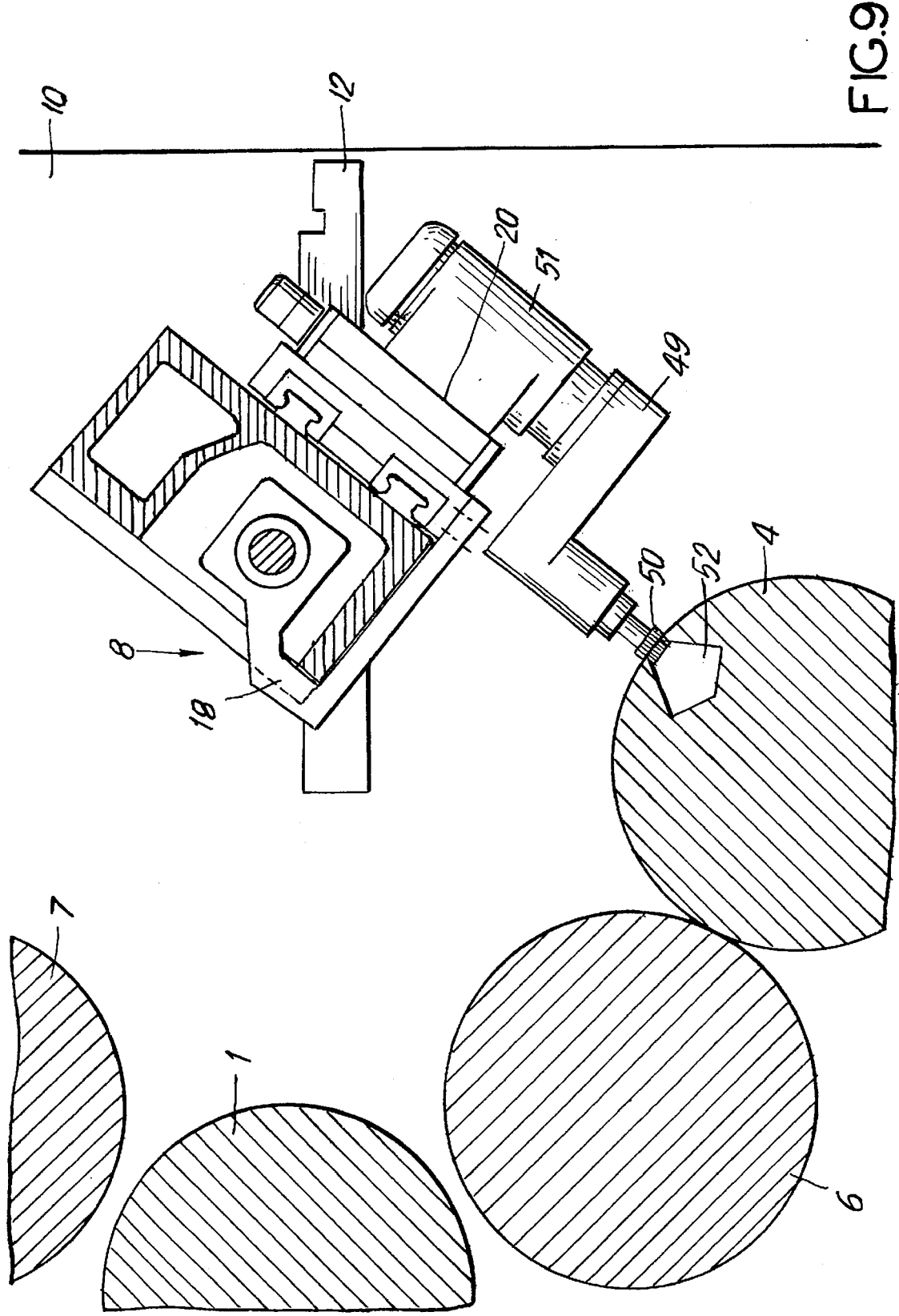
FIG. 9 shows the cross slide rail with a groove machining tool.

Within the framework of cylinder repair, groove edges can also be machined in an advantageous manner with the device according to the invention. For this purpose, with reference to FIG. 9, a cutting device 49 having a corresponding profile cutter or forming cutter 50 with a drive 51 is attached to the tool adapter 20 of the cross slide rail 8. The rotating forming cutter 50 is moved along the groove edges of the clamping groove 52 by means of the longitudinal support 18. A suction device, not shown, for removing cutting chips is also used in this case. The cutting device is adjusted to the form cylinder 4 in the drawing.

Figure 10:
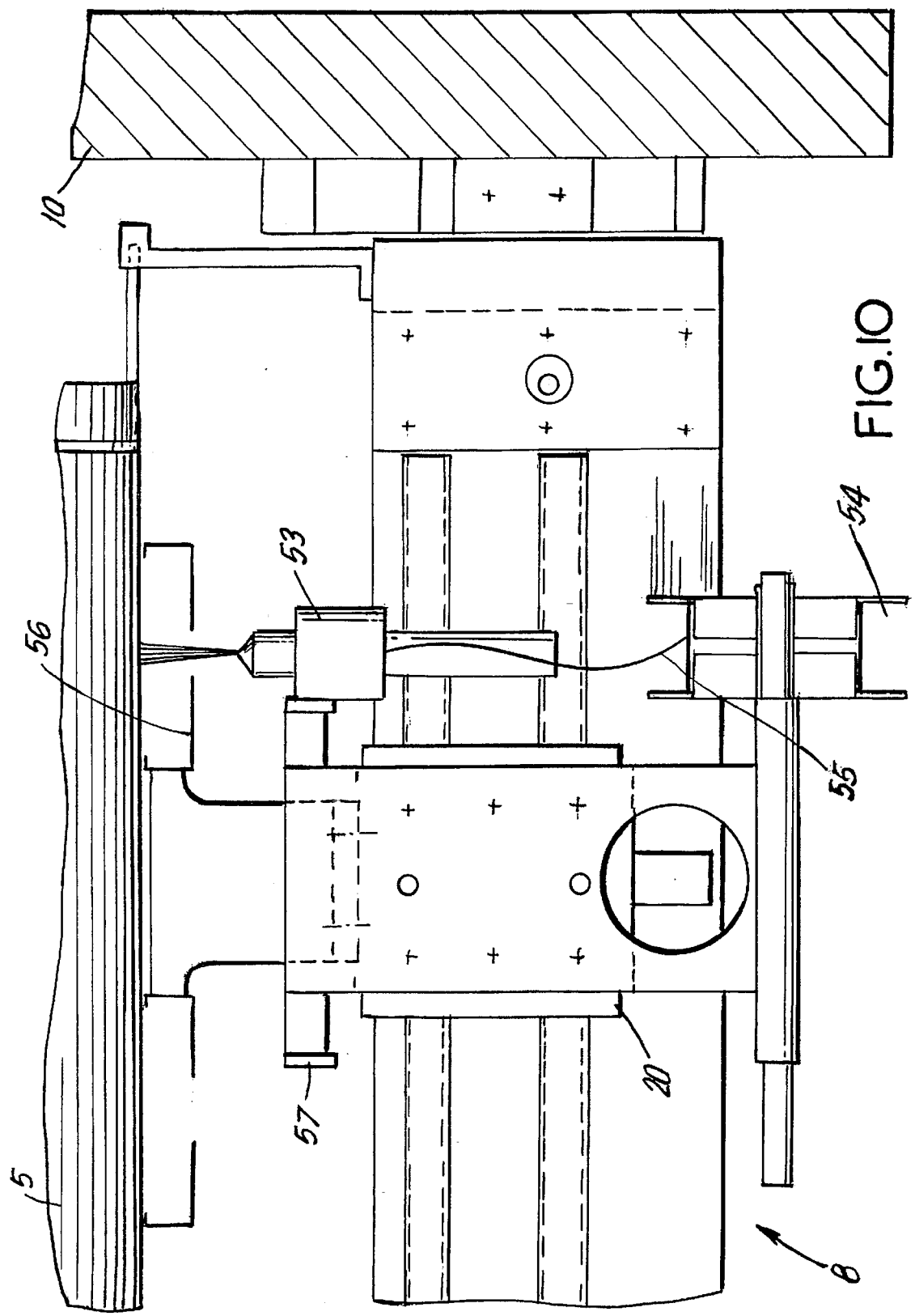
FIG. 10 is a partial view of the cross slide rail with a spray gun.

The surface of the worked off cylinder is degreased and then roughened by blasting. The sand blasting device 43 is advantageously used for blasting. The cylinder is then provided with a new surface layer by means of flame spraying. For this purpose, a spray gun 53 is attached to the tool adapter 20 of the cross slide rail 8 (FIG. 10). The filling material 55 is drawn off from a spool 54 and fed to the spray gun 53. In the embodiment example, the form cylinder 5 is to be provided with an oxide ceramic coating, for which purpose, e.g., aluminum oxide/titanium dioxide is used as filler material. However, the cylinder to be repaired could also be provided with a metal-ceramic (cermet) layer or only a metal layer. A mixture of chromium carbide, chrome nickel alloys and molybdenum powder, for example, are suitable as filler material for a metal-ceramic coating, while a metal coating is advantageously sprayed with a nickel base alloy. For oxide-ceramic coatings, a metal coating of this type is first applied as an adhesive layer before the ceramic cover layer is sprayed on. All of these coatings can be applied in thin-layer or thick-layer processes, multiple layers being sprayed on in the latter process. Common layer thicknesses in the thin-layer process (single-layer dimension coatings) for the adhesive and cover layers range from a few micrometers to approximately 150 micrometers. In the thick-layer process, the thickness of the layer to be applied is several tenths of a millimeter to several millimeters. Before applying the two layers, the form cylinder 5 is preheated. The spray gun 53 is advantageously used for this purpose. When preheating, a cleaning effect on the cylinder surface is achieved at the same time. The active region of the spray gun 53 is enclosed by a cover 56 to which is attached a suction device, not shown.

As in the devices for cylinder machining described above, the spray gun 53 can be switched to another holder 57 for spraying the left-hand portion of the cylinder jacket. When operated, the spray gun 53 is supplied via connections, not shown in the drawing, with air, oxygen and fuel gas, e.g. acetylene. The layer thickness growth achieved on the form cylinder 5 depends on the circumferential speed of the cylinder 5, the speed of the longitudinal support 18 and the feed rate of filler material 55. Advantageous ranges for the circumferential speed of the cylinder, the filler material feed and the speed of the longitudinal support are 20 to 80 m/min., 10 to 200 cm/min and 10 to 80 mm/min, respectively. With the thin-layer process applied in the described embodiment, it is necessary only to seal the layer and polish it. In the thick-layer process, which is also covered by the protective scope of the present invention, the more thickly applied layer is brought to the finished diameter by grinding and is simultaneously polished. The diameter is advantageously measured by means of a Y-measurement device or jockey measuring device. When coating grooved cylinders, the applied layer thickness can be measured at the covers which are advantageously used to cover the grooves.

Figure 11:
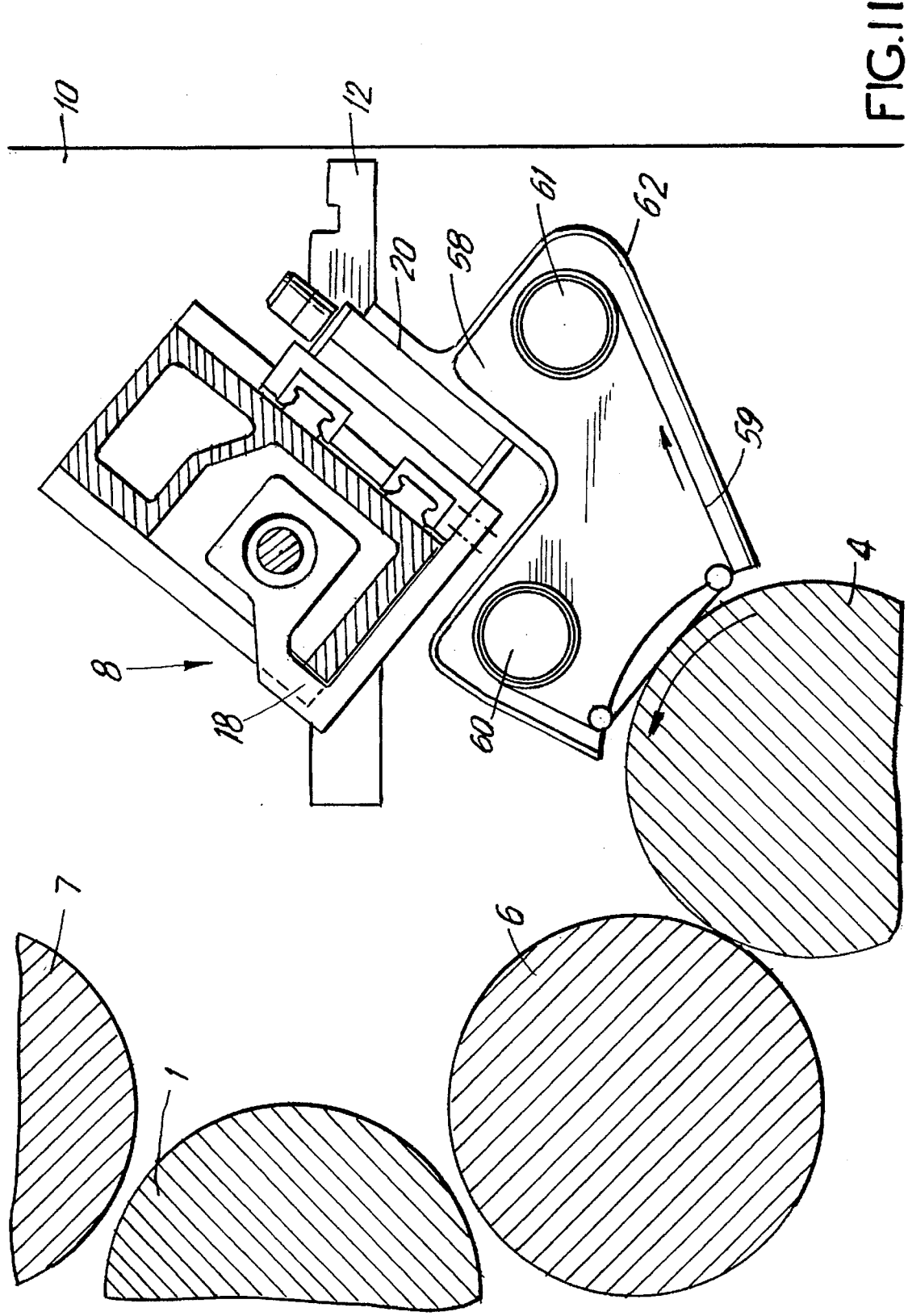
FIG. 11 is a partial view of the cross slide rail with a polishing device.

FIG. 11 shows a polishing device 58 applied to the form cylinder 4 for polishing the applied sprayed coating. The polishing device 58 is fitted to the tool adapter 20 of the cross slide rail 8 and can be moved along the rotating form cylinder 4 by means of the longitudinal support 18. By means of a polishing belt 59 which contacts the cylinder jacket, the sprayed coating is smoothed and polished by removing spurs from the surface. The polishing belt 59 is continually renewed in that it unwinds slowly from a supply spool 60 to a waste spool 61. The polishing belt 59 is enclosed by a cover 62, to which is connected a suction device, not shown.

Figure 12:
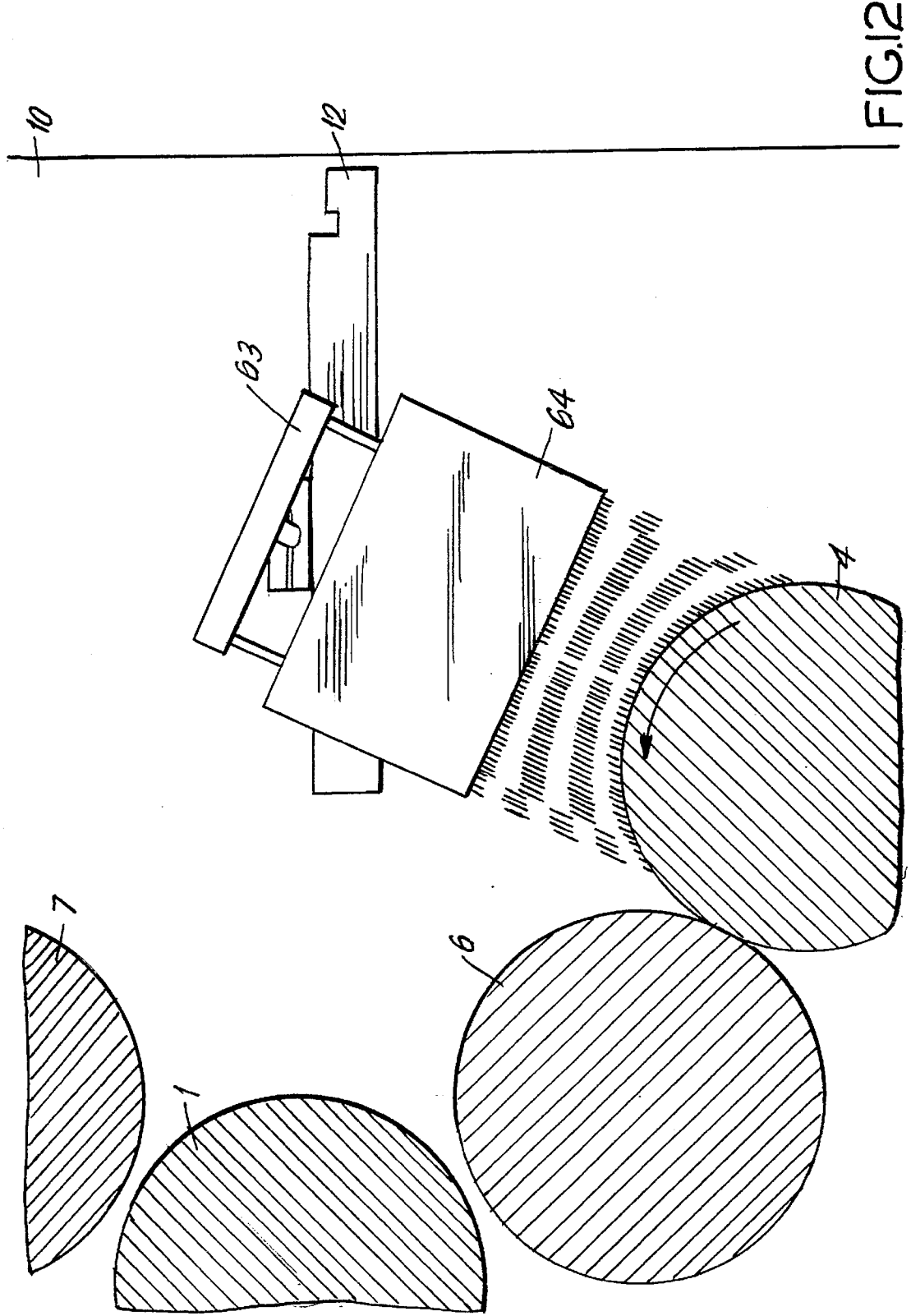
FIG. 12 shows an ultraviolet light arranged at a form cylinder.
Figure 13:
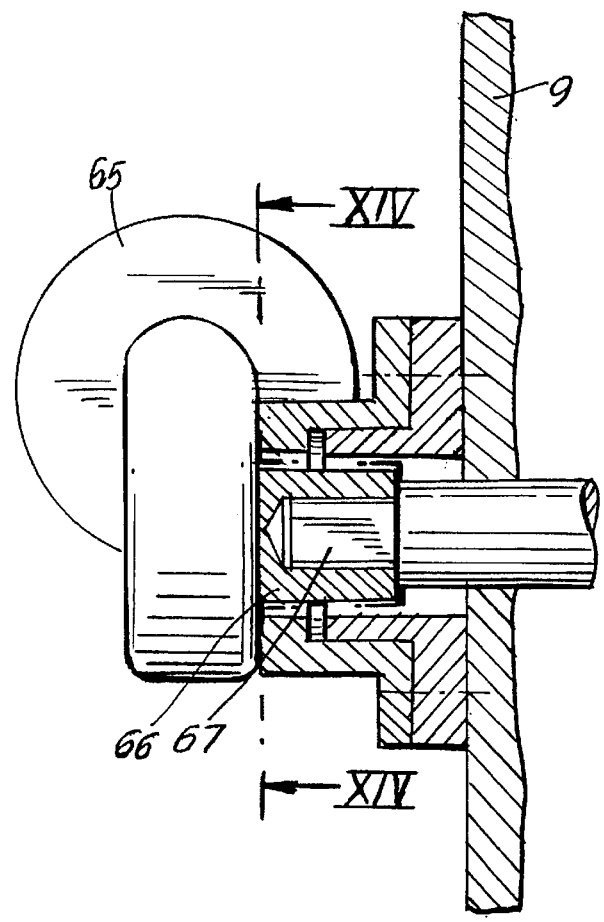
FIG. 13 shows a drive variant for a form cylinder.
Figure 14:
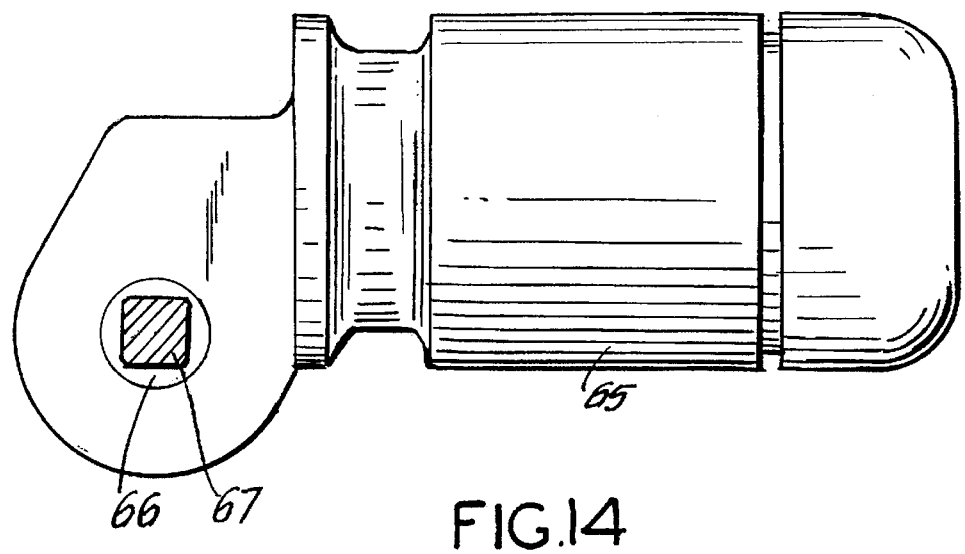
FIG. 14 shows section XIV—XIV according to FIG. 13.

After polishing, the applied layer is sealed. This is done by manual application of a sealer, e.g. an anaerobically hardening sealer. The applied sealer is cured with ultraviolet light to reinforce hardening. For this purpose, a cross-bar 63 carrying UV lights 64 (FIG. 12) is mounted on the strips 11, 12 after removing the cross slide rail 8. The sealer is hardened in a reproducible manner by applying ultraviolet radiation over the course of approximately one hour while the form cylinder 4 rotates slowly. FIG. 13 shows a sharply down-gearing drive for this work step. The gear motor 65 is attached by its power take-off journal 66, which is provided with a square end 67 socket, to the square of the manual drive of the form cylinder. FIG. 14 shows a view of the gear motor 65.

A central control unit is advantageously used for the individual electric drives. The washing drive, the gear motor at the manual drive, the grinding motor, the longitudinal support motor and diverse sensors, such as measurement sensors and position sensors, are connected with this central control unit.

In the embodiment examples, the cylinders were coated by flame spraying. With the present invention, the coating can also be applied by other thermal spraying processes, e.g. plasma spraying, high-speed flame spraying, arc spraying or also laser spraying. Further, it is possible to restore only portions of the cylinder jacket with the invention, which is suitable for repairing other cylinders of printing machines in addition to the form cylinder, e.g. printing cylinders.

The invention is not limited by the embodiments described above which are presented as examples only but can be modified in various ways within the scope of protection defined by the appended patent claims.

We claim:

1. A device for repairing a cylinder of in a printing machine while the cylinder is installed in the printing machine, comprising: a cross slide rail having a base body having longitudinal guides, a longitudinal support slidably mounted on the longitudinal guides, and a transverse support connected to the longitudinal support; means for removably mounting the cross slide rail to side walls of the printing machine so as to be parallel to a longitudinal axis of the cylinder to be repaired; a pull spindle rotatably mounted to the base body and operatively connected to the longitudinal support so that rotation of the pull spindle moves the longitudinal support along the longitudinal guides of the base body; tool holder means connected to the transverse support for carrying a tool for working the cylinder; and means for driving the cylinder.

2. A device according to claim 1, wherein the mounting means includes strips fastened to inner sides of the side walls of the printing machine so as to support the cross slide rail.

3. A device according to claim 2, wherein the cross slide rail is supported on the strips so as to be rotatable through 180° around its longitudinal axis and a vertical axis so that a top cylinder and a bottom cylinder can both be repaired in the printing machine.

4. A device according to claim 2, wherein the cross slide rail has an eccentric provided so as to act in a direction of the transverse support so as to permit adjustment near the mounting means.

5. A device according to claim 1, wherein the longitudinal support is provided so as to be movable at variable speed and in reversible direction.

6. A device according to claim 1, wherein the tool holder means carries one of a grinding device, a turning device, a blasting device, a cutting device, a spray gun for thermal spray coating and a polishing device.

7. A device according to claim 6, and further comprising suction means for removing material worked off the cylinder, the suction means being provided so as to enclose the tool carried by the tool holder means.

8. A device according to claim 1, wherein the cylinder is supported in the printing machine by bearer rings, and further comprising means for covering each of the bearer rings.

9. A device according to claim 1, wherein the cylinder has a clamping groove, and further comprising means for covering the clamping groove.

* * * * *